United States Patent [19]
Raschke

[11] Patent Number: 4,727,389
[45] Date of Patent: Feb. 23, 1988

[54] AUTOMATIC FOCUS AND EXPOSURE CONTROLLED CAMERA

[75] Inventor: Klaus Raschke, Schaumburg, Ill.

[73] Assignee: W. Haking Enterprises Limited, Hong Kong, Hong Kong

[21] Appl. No.: 926,610

[22] Filed: Nov. 12, 1986

Related U.S. Application Data

[63] Continuation-in-part of Ser. No. 825,797, Feb. 7, 1986.

[51] Int. Cl.$^4$ .................... G03B 3/00; G03B 7/087; G03B 9/58; G03B 15/05
[52] U.S. Cl. .................... 354/402; 354/419; 354/422; 354/435; 354/230
[58] Field of Search .................... 354/402–405, 354/408, 419–423, 435–440, 446–448, 195.1, 195.11, 230, 234.1, 235.1, 270, 271.1, 267.1

[56] References Cited

U.S. PATENT DOCUMENTS

| | | | |
|---|---|---|---|
| 3,274,914 | 9/1966 | Biedermann et al. | 354/405 X |
| 4,295,715 | 10/1981 | Breen | 354/400 |
| 4,355,872 | 10/1982 | Kitai et al. | 354/400 |
| 4,614,417 | 9/1986 | Hata et al. | 354/403 |

FOREIGN PATENT DOCUMENTS

98414 6/1985 Japan .................... 354/400

Primary Examiner—W. B. Perkey
Attorney, Agent, or Firm—Russell E. Hattis; Stephen R. Arnold

[57] ABSTRACT

An electrically operated camera is operated automatically from between far-focus and near-focus lens settings responsively to ambient light sensings. The far-focus lens setting is less than infinity. Under strong lighting conditions, the aperture is automatically set between a range of values, the largest of which is no greater than the hyperfocal aperture value corresponding to the far-focus setting of the lens, thereby setting the outer boundary of the depth of field at infinity. In weak light, a flash system is automatically enabled, the lens is set to a near-focus position, and the aperture is automatically set at its maximum value. Timed energization of a single electrically operated solenoid is used to establish all settings in both modes. An additional macrofocus setting is provided for setting the lens at a focusing distance much shorter than the near-focus setting, and the aperture is automatically set at its minimum value in flash mode, or over a range of values according to ambient sensings when bright lighting conditions prevail.

30 Claims, 12 Drawing Figures

AUTOMATIC FOCUS AND EXPOSURE CONTROLLED CAMERA

RELATED APPLICATIONS

This application is a continuation-in-part of U.S. application Ser. No. 825,797 filed Feb. 7, 1986.

TECHNICAL FIELD

The technical field of the invention is the photographic camera art, and in particular cameras having provision for automatic electronic control of lens focus and aperture setting.

BACKGROUND OF THE INVENTION

A coworker of the inventor has recently developed a simplified automatic control system for electrical cameras. This system is the subject of patent applications pending in various countries throughout the world, and in the United States under application Ser. No. 785,572 filed Oct. 8, 1985, now abandoned. This system sets the lens focus between one of two settings according to ambient scene light sensings. Under relatively bright light conditions, the lens is selectively set by one solenoid to a far-focus position for objects at significant distances from the camera, this far-focus position focusing the lens at an object distance less than infinity. An automatic aperture control, similarly governed by scene illumination, establishes, in the most preferred form of the invention, under bright light conditions an aperture setting at one of preferably two values each less than the maximum possible aperture value, the larger of these being the hyperfocal aperture value corresponding to the far-focus setting of the lens. The smaller of these is selected by a second solenoid which is energized when a bright range of light values is detected, and the larger of these settings is selected by a third solenoid when a lower range of light values is detected, but which is still bright enough that flash illumination is unnecessary. The abovementioned hyperfocal aperture setting has the effect of placing the far edge of the depth of field at infinity, and the near edge at approximately half the object focusing distance. With the aperture at the second reduced aperture setting, a greater depth of field is achieved so that objects at infinity are rendered somewhat sharper, and the near edge of the depth of field moves somewhat closer to the camera. Under relatively weak lighting conditions, a flash system is automatically actuated, the lens is moved to the near-focus position, and the aperture is automatically set to its maximum value where the depth of field is at a minimum.

Thus for each desired additional operative setting, it would seem that an additional solenoid would be needed, which would be costly and bulky.

A more desirable control system is needed whereby preferably a single solenoid or other control means can be used in such a system to govern the lens adjustment and the various aperture settings.

The instant invention has some features in common with those described in U.S. application Ser. No. 825,797 filed Feb. 7, 1986. However, unlike the most advantageous form of the present invention, it discloses aperture and focus control systems requiring two independent solenoids to provide a few focus and aperture settings. To provide for a large range of aperture settings, the present application, unlike this other application, discloses the employment of a rotary contactor for rotating an aperture-setting control cam so as to provide sensing information to an associated control system providing a large number of aperture settings. U.S. Pat. No. 4,549,801 issued Oct. 29, 1985 to Winter and owned by the assignee of the present invention also discloses the employment of such a rotary contactor in conjunction with a control circuit to govern such settings. However, in other respects it is a completely different focus and aperture control system and bears no relationship to the present hyperfocal setting of the lens to which one aspect of the present invention relates. In this patented system as well, independent solenoids are necessary to its implementation.

SUMMARY OF THE INVENTION

According to a feature of the invention, a pair of synchronous rotary drive systems driving a lens focusing ring and an aperture control cam are governed by properly timed control signals governing the energization of a single control solenoid operatively linked to these systems. Under bright scene illumination the focusing rotation of the lens is stopped at a far-focus position corresponding to a long object distance less than infinity, and the exposure control cam is stopped to set the lens aperture setting to one of a number of possible values less than the largest aperture setting, in the preferred embodiment numbering eight, depending on the amount of light detected. The largest of these eight aperture settings is preferably the hyperfocal aperture value corresponding to the far-focus lens setting. Under weak scene illumination a flash system is automatically enabled, and properly timed solenoid energization causes the lens focusing rotation to be arrested at a near-focus position corresponding to an object distance substantially less than the far-focus position, and causes the aperture control cam to be arrested at a position yielding a maximum aperture value.

According to a related feature of the invention, the final degree of rotation of the lens is established early during the synchronous rotation of the two scanning drive systems by trapping the arresting member in one of two positions according to the initial state of energization of the solenoid, this position being maintained irrespective of subsequent states of the solenoid, to arrest the lens at either the near-focus or the far-focus setting thereof, according to ambient illumination sensings. According to a further related feature of the invention, aperture control is achieved by maintaining a cam-arresting pawl at a retracted position by energizing the solenoid, and by releasing this pawl to arrest the aperture control cam by de-energizing the solenoid at an appropriate time. In particular, under dim lighting conditions requiring maximum aperture, the solenoid is de-energized prior to system rotation so as to engage the first cam step, thereby establishing the maximum possible aperture for the system; whereas, under lighting conditions sufficiently bright that flash illumination is unnecessary, the solenoid is energized prior to system rotation, and de-energized at an appropriate time so as to drop the pawl to arrest cam rotation at one of the reduced aperture settings.

According to related features of the invention, the aperture setting under conditions of relatively bright scene illumination is governed according to filmspeed sensings as well as ambient scene illumination, and the changeover between flash mode and ambient illumination mode is similarly governed by filmspeed sensings. There is further provided a macrofocus (ultra-short focus) capability which is achieved by arresting the lens movement close to its initial (very close focus) position, there further being provided means for controlling the aperture setting over a range of values according to filmspeed sensings, and for providing automatic flash mode of operation under weak lighting conditions with the aperture automatically set to its minimum position. This changeover threshold is also governed by filmspeed. The aperture setting is set automatically at its largest value in this flash mode. All of the foregoing features are accomplished by means of a system of minimum complexity and expense.

Other features and aspects of the invention will become apparent upon making reference to the specification, claims, and drawings to follow.

DESCRIPTION OF THE INVENTION

The present invention deals with a system whereby a still camera is operated between daylight and flash mode responsively to a photosensing of the ambient lighting conditions. Below a given detected threshold level of ambient illumination, preferably governed by filmspeed entry of one form or another, the camera is automatically actuated to a flash mode providing a maximum lens aperture setting and automatically setting the lens to a near-focus condition. Above this threshold level the flash is disabled, the lens is automatically moved to a far-focus position, and the aperture is adjusted accordingly over a range of lens aperture values less than the largest flash mode setting. In particular, the first of these reduced aperture settings is the preferably hyperfocal aperture setting, i.e., that aperture value which, with the lens set at the far-focus position, places the far edge of the depth of field at infinity, and the near edge at approximately one-half the object focusing distance of the lens. Brighter ambient sensings cause correspondingly reduced aperture settings to be established, thereby sharpening the image quality throughout the hyperfocal focusing range, and extending it additionally somewhat closer to the camera.

Both aperture and focus settings are established by properly timed control signals supplied to single-solenoid governed linkages establishing the lens focus and the aperture settings. Additionally, there is provided a macro focus position providing for a lens focus position such that extremely close objects will be in focus, the system concomitantly stopping down the aperture to its minimum value to provide maximum depth of field during flash exposures. If flash is unnecessary, then the aperture value is automatically set according to ambient light sensings.

Figure 1:
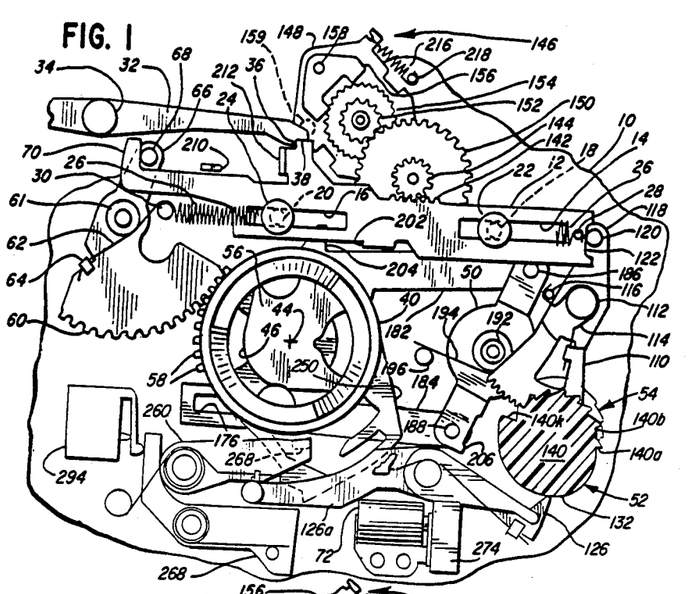
FIG. 1 is a partially cutaway front elevational view of the principal components of a focus and aperture control system, a focus control system, and an exposure control system as mounted on a rear mounting board, the system being in a cocked condition.
Figure 2:
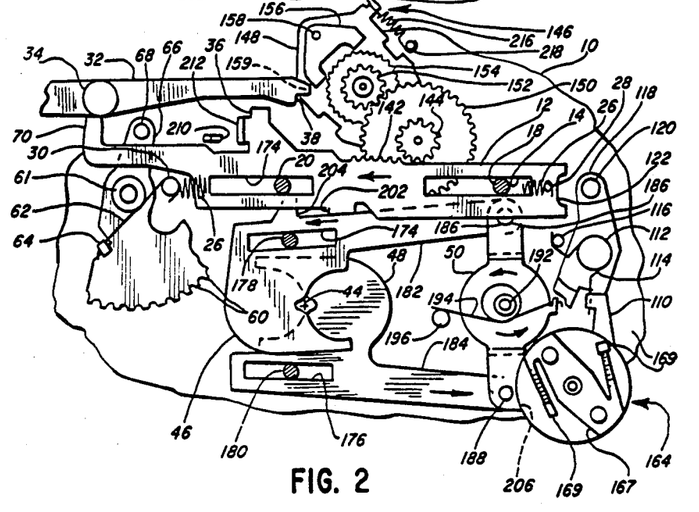
FIG. 2 is similar to FIG. 1, further having central components removed to show the initial phase of the opening of a pair of variable aperture shutter blades.

FIG. 1 shows in partial cutaway form the principal elements of the shutter release system of the present invention mounted on a rear mounting board 10. A shutter actuating slide 12 has a pair of elongated guide slots 14,16 disposed along the length thereof and is held slidably secured to the rear mounting board by guide pins 18,20 having retaining crowns 22,24 thereon. A slide energizing spring 26, fastened at its righthand end to the shutter slide by a post 28 and at its lefthand end to the rear mounting board 10 by a pin 30, thus urges the shutter slide to the left. A shutter release bar (release lever) 32, rotatably mounted on a pivot 34, is configured at the righthand end with a release bar latch face 36 confronting a complementarily configured shutter slide latch face 38 provided on an extension of the shutter slide 12. Spring bias means 11 (not shown in FIG. 1; see FIG. 12) urge the shutter release bar 32 clockwise to hold the shutter slide 12 to the right in a cocked position as shown. A counterclockwise rotation of the shutter release bar 32 will release the latch engagement, allowing the shutter slide 12 to move to the left under the action of the slide energizing spring 26, ultimately to actuate the shutter through an exposure cycle.

The upper surface of the shutter actuating slide 12 is provided with a toothed rack 142 engaging a pinion gear 144 drivingly coupled to a velocity limiter consisting of elements of a velocity limiter assembly 146 consisting of elements 150,152,154,156,148, 158,216,218. These elements are not the subject of the instant invention and will not be discussed further, except to state that their function is to inhibit the leftward velocity of the shutter actuating slide 12 until the complete possible range of focus and aperture settings have been traversed. After this time, the velocity limiter assembly 146 disengages from the shutter actuating slide 12, and the slide moves rapidly to the left under the action the spring 14, shortly thereafter causing initiation of shutter actuation.

Figure 3:
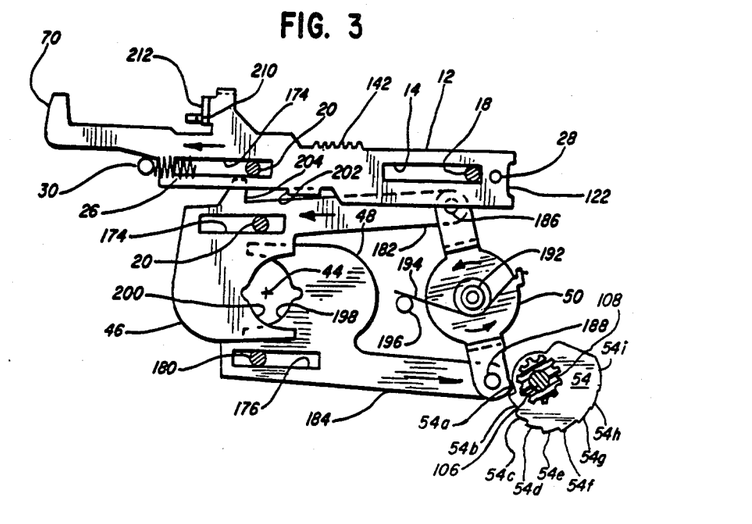
FIG. 3 shows the principal elements of FIG. 2 at the extreme open limit of the shutter blades.

Two principal mechanical control systems are also shown in FIG. 1. One system rotates a focus control ring 40 which varies the position of a lens cell assembly 42 along the optic axis 44, as shown in better detail in FIG. 4. The other system controls the exposure by adjusting the maximum stroke of an impulse-driven variable aperture shutter 46,48,50 as best shown in FIG. 3. An exposure control cam assembly 52 carries a step-shaped stroke limiter cam 54 disposed to obstructingly limit the shutter stroke. Rotation of the exposure control cam assembly 52 to a suitable point before the shutter is driven open will control the exposure, and in particular the effective aperture, as will be discussed.

Considering first the focus control system in more detail, the rotatably mounted focus control ring 40 (focus control member) has a central clear aperture 56. Gear teeth 58—58 are provided along one margin thereof engaging confronting teeth of a rotatable focus drive sector gear 60 mounted on a pivot 61. A focus drive energizing spring 62 attached at one end to pin 30 mounted on the rear mounting board and at the other to a post 64 on the sector gear 60 urges the sector gear in a counterclockwise direction. The focus drive sector gear 60 has a regulator extension 66 carrying a regulator pin 68 at the end thereof disposed so that the pin confronts an extension hook 70 on the shutter slide 12. In the cocked state shown in FIG. 1, the engagement of the regulator pin 68 with the hook 70 prevents the sector gear 60 from rotating so as to drive the focus control ring 40 through the focusing range of the lens. As will subsequently discussed in more detail, properly timed actuation of a control solenoid 72 will cause the rotation of the focus control ring 40 to be interrupted so as to arrest the lens motion at either a near-focus or a far-focus position.

It will further be noted with reference to FIG. 1 that any such arresting rotation of the focus control ring 40 will simultaneously arrest the rotation of the sector gear 60, causing the regulator pin 68 to be similarly arrested in its leftward travel, allowing the extension hook 70 of shutter slide 12 to continue its movement to the left. Thereafter throughout the remainder of the exposure operation, the lens focus setting is retained until restored to its original dormant position shown in FIG. 1 by a cocking operation returning the shutter slide 12 to the cocked position shown in FIG. 1.

Figure 4:
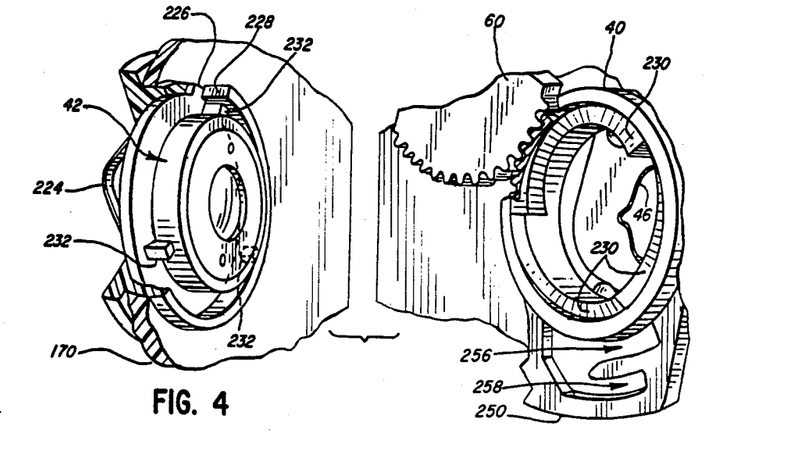
FIG. 4 is a fold-out view of the central region of the rear mounting board of FIG. 1 confronting a front mounting board carrying a lens cell assembly. Details of the lens focus control system have been removed for clarity.

FIG. 4 shows further partial details of the lens focusing system. The various lens-arresting elements have been removed for purposes of clarity. A camera lens 43, mounted in the lens cell assembly 42, is movably retained in a lens cell receiving sleeve 222 extending from the front mounting board 170 generally towards, and coaxially disposed with respect to, the focus control ring 40. A wave spring 224 disposed between the front mounting board 170 and the cell assembly tends to force the lens cell 42 towards the focus control ring, and an antirotation lug 226 guided by a lug guide slot 228 (one wall cut away for clarity) in the lens cell receiving sleeve 42 prevents rotation of the lens cell. With reference to the focus control ring 40, it will be seen that along the inner periphery of the ring are three annularly disposed ramps 230—230. The lens cell 42 is provided along the peripheral edges thereof with three ramp follower lugs 232—232, each lug being positioned to confront one of the three focus control ring ramps 230—230. During the cocking operation, rotation of the focus control ring 40 counterclockwise as shown in FIG. 4 then causes each ramp 230—230 to force its associated follower lug 232—232 forward against the force of the wave spring 224, thereby moving the lens 43 progressively farther away from the rear of the camera to a very close focusing position. This is the dormant position of the lens 43 prior to initiation of the exposure operation. During the exposure operation, the lens 43 is driven from the very close focusing position corresponding to a macrofocus position (ultrashort object focusing distance) towards a terminal far-focus position.

Considering next the exposure control system (see also FIG. 3), the rotatable exposure control cam assembly 52, rotatably mounted on a pivot 106, carries a pinion 108 integral therewith which engages an exposure control sector drive gear 110 rotatably mounted on a pivot 112. An exposure cam energizing spring 114, secured at one end to a post 116 fastened to the rear mounting board 10 and at the other to a portion of the sector drive gear 110, urges the sector gear in a counterclockwise direction, so as to rotate the exposure control cam assembly 52 in a clockwise direction.

As in the case of the focus drive sector gear 60, the exposure control sector gear 110 is provided at one end thereof with a regulator extension 118 and a regulator pin 120, the pin being disposed in confronting engagement with a cutout 122 in the righthand end of the shutter slide 12. The exposure control cam assembly is provided with an integral exposure control cam (aperture control member) 140 having a number of ratchet teeth 140a–140i disposed to serially pass an opposing control pawl (aperture arresting member) 126 mounted on a rotatable control pawl assembly 128. As will subsequently be discussed in greater detail, properly timed actuation of the control solenoid 72 will cause the rotation of the exposure control cam 140 to be arrested at the appropriate time by the control pawl 126 to govern the exposure. As in the case of the focus control ring 40, arresting the rotation of the cam assembly 52 stops the rotation of the sector drive gear 110, causing the regulator pin 120 to disengage from the cutout 122 in the righthand end of the shutter slide 12. In this respect it should also be recognized that complete resynchronization of the focus control ring 40 and the exposure control cam assembly 52 will be reestablished at their original dormant positions when the shutter actuating slide 12 is returned to the cocked position shown in FIG. 1.

FIG. 2 shows the initial phase of the opening of the shutter. The shutter will be seen to consist of overlapping upper and lower shutter blade leaves 46,48, each leaf having a guide slot 174,176 therein whereby the leaves are captively retained by a pair of guide pins 178,180. Each shutter leaf 46,48 is provided with a blade extension arm 182,184, the ends of each blade extension arm being attached by pivots 186,188 to the ends of a coupling bar mounted on its own pivot 192. A shutter return spring 194 anchored at one end to a portion of the coupling bar and at the other to a post 196 on the rear mounting board 10 provides a clockwise torque to the coupling bar to return the shutter blades 46,48 to the completely overlapping position wherein arcuate cutouts 198,200 in the shutter blade leaves are completely masked.

In the phase of shutter actuation shown in FIG. 2, the shutter slide 12 has moved rapidly to the left. An extension is formed on the lower edge of the shutter slide to form a striker 202, and a corresponding extension is formed at the upper edge of the upper shutter blade leaf 46 to form an anvil 204 in confronting relationship to the striker. FIG. 2 shows the phase of shutter opening immediately after the striker 202 has struck the anvil 204 to impart a leftward movement to the upper shutter blade leaf 46, this movement being coupled to the lower blade leaf 48 by the coupling bar 50 to cause the lower shutter blade leaf to move rapidly to the right and in synchronism therewith against the force of the shutter return spring 194.

FIG. 3 shows the principal elements of the system at the extreme limit of travel of the shutter blades 46,48. It will be noted that the coupling bar 50 is provided with a small extension 206 generally confronting a series of cam steps 54a-54i formed on the stroke limiting cam 54, this stroke limiting cam being rigidly coupled to the exposure control cam assembly 52. Rotation of the exposure cam assembly 52 by a given amount positions the proper cam step to confront the coupling bar extension 206. The maximum stroke of the coupling bar 50 is therefore limited according to which cam step is positioned to confront it. The cutouts 198,200 in the shutter blade leaves 46,48 are configured so that the aperture of the shutter progressively increases as the stroke of the coupling bar 50 increases. Thus, by limiting the stroke of the coupling bar 50, the exposure is controlled. Immediately upon striking the interposed confronting cam step, the coupling bar 50 rebounds to drive the shutter leaves 46,48 to a closed configuration.

In particular, it should be noted that this type of shutter is open for different amounts of time according to the orientation of the stroke limiting cam 54. Further, the effective aperture value governing the depth of field is also similarly varied, i.e., a longer stroke gives a larger effective aperture.

Figures 10, 11:
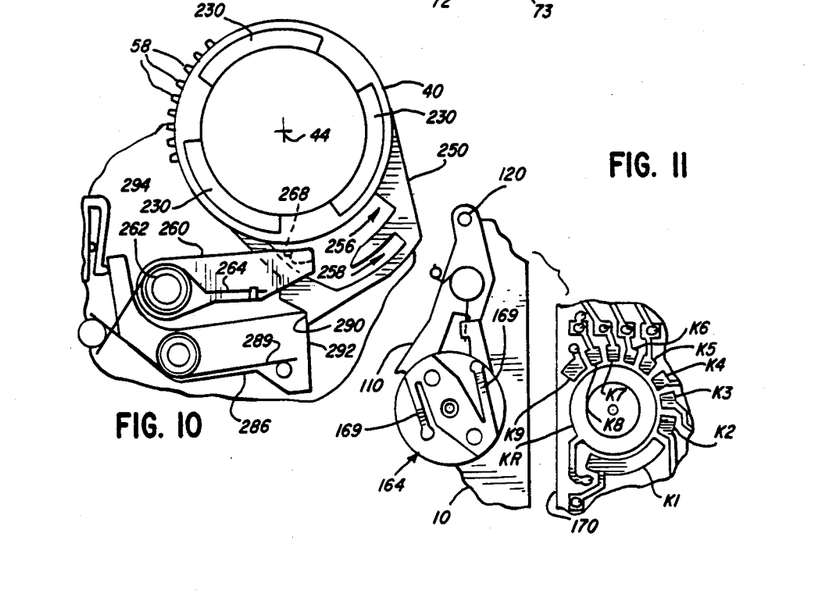
FIG. 10 shows early termination of the focusing adjustment to provide a macrofocus capability by engagement with a rotation limiting element.
FIG. 11 is a fold-out view showing a rotary contactor used to govern the control system and its opposing metallization pads mounted on the front mounting board.

It will be noted with respect to FIG. 2 that the exposure control cam assembly 52 of FIG. 1 is surmounted by an integral exposure control rotary contactor assembly 164. The assembly has mounted on the forwardly facing surface thereof a central conducting strap 167 having pivotal integral contacting fingers 169—169 extending forwardly therefrom. FIG. 11 is a fold-out view of the relative position of the aperture control rotary contactor 164 disposed generally opposite a front mounting board 170 having a central metallization ring KR surrounded by a series of contacting metallization pads K1-K9. As the contactor 164 rotates, the fingers 169—169 shortingly serially bridge the ring KR to the pads K1-K9 in sequence to provide sensing information to the control circuit shown in FIG. 12. These sensings in conjunction with ambient photosensings are utilized by the control circuit to govern the energization of the control solenoid 72 at the appropriate positions of the lens focus and aperture setting systems.

The broad details of the focus and exposure systems having been discussed, the controlled interaction between these systems whereby lens focus and exposure control are held mechanically interrelated so as to be controlled by a single solenoid will be discussed next.

The camera of the invention is operable automatically between two "normal" modes responsively to ambient light sensings. An additional "macrofocus" mode is also provided, and will be discussed subsequently. In weak light, the camera is operated automatically to a flash mode to set the lens at a near-focus position yielding an object focusing distance of 8.5 feet, and setting the exposure control system to yield maximum aperture, i.e., maximum shutter blade extension stroke, during exposure. Maximum aperture in this system is f/4.5. When the ambient light exceeds a given threshold, the system is actuated into daylight mode. In daylight mode the flash is disabled, and the exposure control system rotates the exposure control cam assembly to interpose one of the stroke limiting cam steps 54b-54i in position to adjust the exposure according to ambient light sensing and filmspeed. In particular, step 54b is chosen such that with the lens set at the far-focus position, i.e., 13.5 feet, the extension of the shutter blades 46,48 is such as to establish the hyperfocal aperture setting of f/5.5. The depth of field of the lens 43, having a focal length of 34 mm, thus extends from approximately 7 feet to infinity.

For values of ambient illumination substantially higher than the threshold value, one of the remaining cam steps 53c-53i is interposed to yield an effective aperture setting less than the hyperfocal value. As will subsequently be discussed, the threshold value is preferably established according to filmspeed sensings, so that selection of the proper stroke cam among the elements 54b-54i properly corrects the camera for exposure, and further serves to sharpen the resolution of objects near the ends of the original hyperfocal focusing range, and further serves to extend the near edge of the focusing field closer towards the camera. All of the foregoing adjustments are carried out simply by timing the energization of a single control solenoid during the adjustment of the focus control assembly and the exposure control system.

Figure 5:
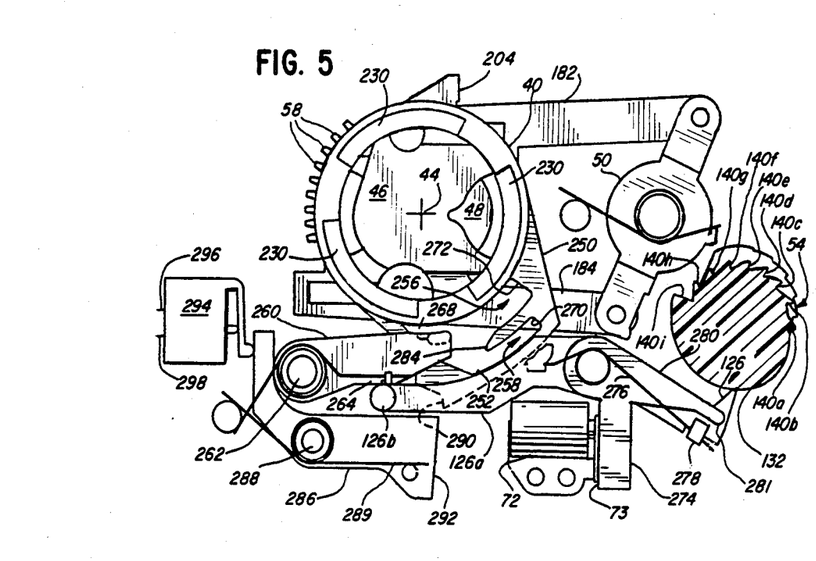
FIG. 5 shows the principal focus and exposure control elements of the system shown in FIG. 1 in the dormant cocked condition.

Referring next to FIGS. 5-9, the details of the interaction of the two systems in both modes are shown in various phases. FIG. 5 shows the principal elements of the two control systems with the system in a fully cocked state as shown in FIG. 1. The focus control ring (focus control member) 40 is provided with an extension 250 extending outwardly from its base, the extension having an arcuate cutout 252 traversing the major lateral dimension of the extension. The arcuate cutout 252 is divided over approximately half of its terminal length by a passage dividing wall (trapping means) 284 defining two separate passages, namely an inner passage 256 and a somewhat shorter outer passage 258. A focus control arm 260 is mounted about a pivot 262 to be urged clockwise by a spring 264. Projecting downward from the outer end of the focus control arm 260 is a focus control pin (focus arresting member) 268 configured to extend down into the arcuate cutout 252. It will be recalled that in the cocked state the focus control ring 40 is in its extreme counterclockwise position. This is chosen to correspond to the very short focusing distance (macrofocus distance) of 1.5 feet. During the focus adjustment process, as will shortly be shown, the focus control arm 260 will be controlled so that the focus control pin 268 enters either the somewhat shorter outer passage 258 to arrestingly engage the passage end 270, placing the lens at the near-focus position, focusing the lens at 8.5 feet, or alternatively, into the longer inner passage 256 to strike the end 272 thereof establishing the far-focusing distance of 13.5 feet. Whenever the latter condition is established, the exposure control system will establish an effective aperture no greater than the hyperfocal aperture setting for this latter focusing distance.

The exposure control cam assembly 52 is arrestingly stopped during the system's adjustment phase of the exposure cycle by causing the control pawl 126 to drop into engagement with one of the exposure control cam steps 140a-140i. This locking is caused by a timed de-energization of a control solenoid 72 as follows. Immediately facing the control solenoid is a pole piece 73 mounted in an amature 274, the armature being rotatably mounted about a pivot 276. The control pawl 126 is similarly pivotally mounted about the pivot 275 to form part of a focus control lever 126a having a pin 126b at the left end thereof. The control pawl 126, and its associated lever 126a, is continuously urged to rotate in a counterclockwise direction under the action of a spring 276 engaging a boss 278 located proximate to the control pawl. The action of the spring 276 is to cause the control pawl 126 to follow the contours of the exposure control cam 140 during the rotation thereof. It will be noted that such following will cause the pin 126b to retreat as the control pawl 126 moves towards the center of the exposure control cam 140, with the result that the focus control arm 260 will rotate clockwise. Sufficient advance of the control pawl 126 in this direction will thus cause the focus control pin 268 to enter the outer (short-focus) passage 258 of the focus control ring extension 250. If, on the other hand, this inward motion of the control pawl 126 is arrested, then the focus control pin 268 will enter the inner (long-focus) passage 256 instead.

To allow the control solenoid 72 to govern these operations, the armature 274 is biased clockwise by a light spring (not shown) which will rotate the pole piece 73 into contact therewith. The armature is further provided with an extension 280 which extends opposite the control pawl boss 278 so as to present a face 281 in confronting relationship thereto. It will be noted with reference to FIG. 5 that in the cocked position, the major lobe 132 of the exposure control cam 140 has urged the control pawl 126 sufficiently to the retracted position that the extension face 280 and the boss 278 are no longer contacting, thereby allowing the armature spring (not shown, as previously mentioned) to rotate the armature pole piece 73 up against the control solenoid 72. Thus, if the control solenoid 72 is held in an energized condition during rotation of the exposure control cam 140, the control pawl 126 will be prevented from dropping into engagement with the cam steps 140a-140i until the control solenoid 72 is de-energized after system rotation begins.

Figure 6:
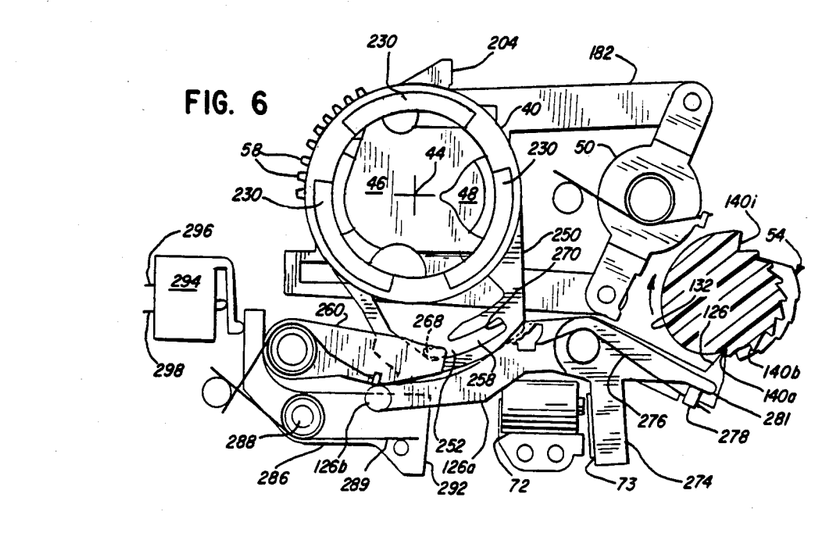
FIG. 6 shows an intermediate phase of focus adjustment in flash mode.
Figure 7:
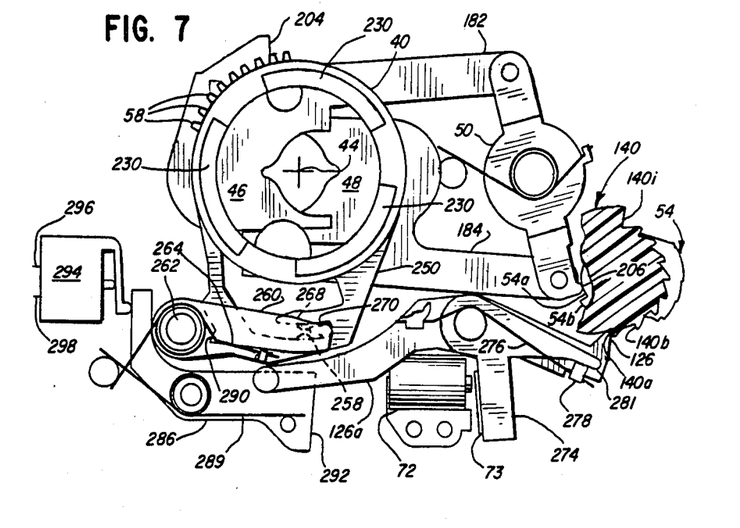
FIG. 7 shows the terminal phase of focus adjustment in flash mode shortly after lens focusing has been completed, and further showing the variable aperture shutter at the moment of full-aperture extension.

Considering first the operation of the system during weak ambient illumination, during the adjustment process the control solenoid 72 is immediately de-energized. The result is that the control pawl 126 under the influence of its drive spring 276 will follow the contours of the exposure control cam 140 until it hits the first of the arresting steps 140a. This state of affairs is shown in FIG. 6. It will be seen that the focus control pin 268, for reasons previously outlined, is now urged to enter the outer passage 270 of the focus control ring extension 250. The focus control ring 240 will continue to rotate under the rotation derived from its drive spring 62 as shown in FIG. 1, finally reaching the arresting near-focus position shown in FIG. 7. FIG. 7 further shows the system at a later instant in time subsequent to final focus adjustment, and wherein the shutter blades 46,48 are at their maximum stroke. The stroke is limited by the engagement of blade arm extension 206 with stroke limiter cam step 54a, which is the step yielding maximum exposure and maximum effective aperture. Thus, simply by de-energizing the control solenoid 72 immediately, the lens is automatically driven to the near-focus position, and the shutter system stroke is set for maximum exposure.

Figure 8:
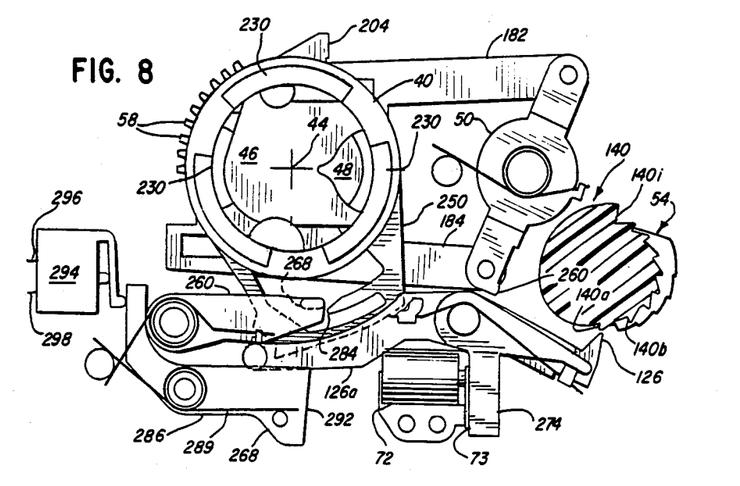
FIG. 8 shows an intermediate phase of adjustment of the lens focus and aperture setting in the daylight mode of operation.
Figure 12:
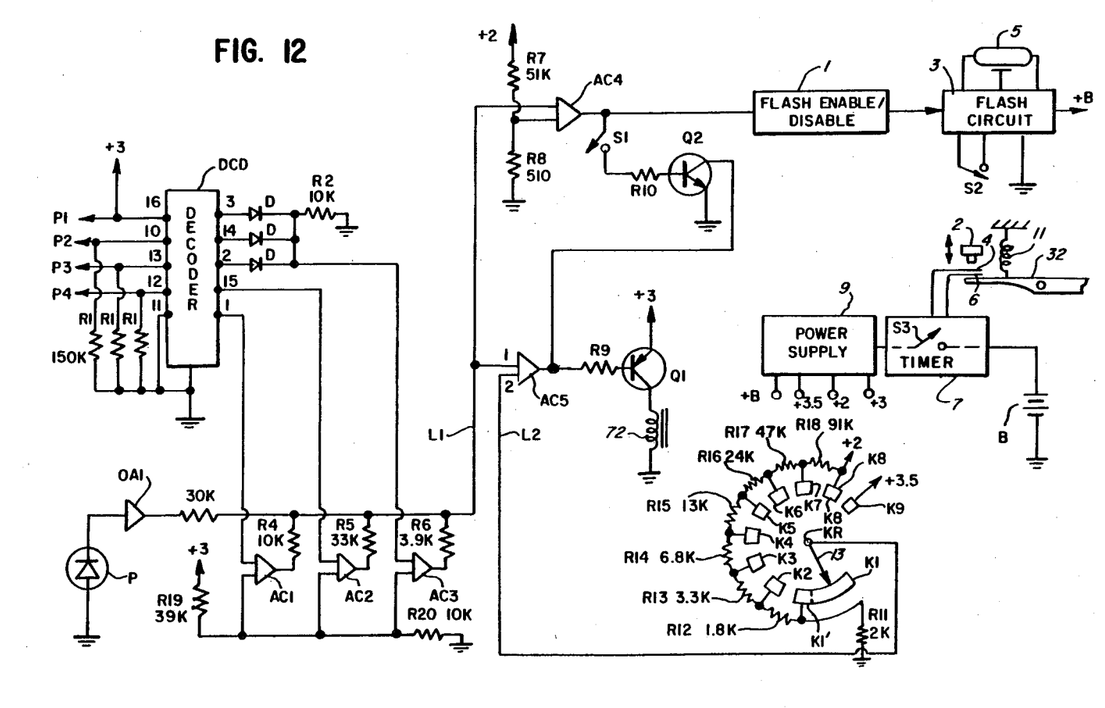
FIG. 12 is a schematic diagram for the electrical control circuit used to govern camera focus and exposure, having certain control subcircuits in block schematic form.

In daylight mode, the control circuit shown in FIG. 12 immediately energizes the control solenoid 72. With reference to FIG. 6, it will be seen that the boss 278 on the control pawl 276 will immediately engage the extension face 281 of the armature extension 280, so as to inhibit inward movement of the control pawl 126. Also, so long as the control solenoid 72 remains energized, pin 126b on the focus control lever 126a will maintain the focus control pin 268 aligned to enter the inner (long-focus) passage 256 of the focus control ring extension 250. FIG. 8 shows the intermediate stage of the adjustment process in this case. It will be noted that the control solenoid 72 remains energized while the control pawl 126 passes the first step 140a of the exposure control cam 140. Recalling that the rotation of both the focus control ring 40 and the exposure control cam assembly 52 remain synchronized at least until one of them is arrested, it will be seen that a slight additional rotation of both elements will cause the focus control pin 268 to be trapped in the inner passage 256 upon passing the end 284 of the passage dividing wall 254. The rotation of the focus control ring 40 will therefore continue irrespective of what happens thereafter to the exposure control cam assembly 52 until the control ring is arrested at the far-focus position. The length of the contact metallizations K1-K9 (FIG. 11) and their orientation with respect to cam steps 140a-140k are chosen to provide this feature.

Figure 9:
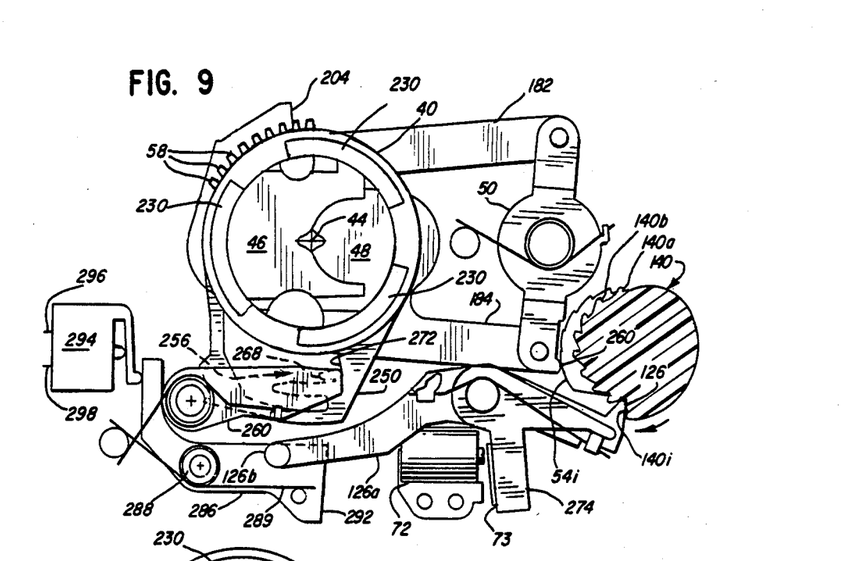
FIG. 9 shows the elements of FIG. 8 with focus and aperture settings fully established, and the variable aperture shutter at maximum stroke when fully stopped down.

FIG. 9 shows the system configuration attained under strong ambient lighting conditions wherein the control solenoid 72 is finally operated to a de-energized condition to drop the control pawl 126 into the extreme terminal step 140i of the exposure control cam 140. It will be further noted that in this orientation the stroke limiting cam 54 is oriented to present step 54i having maximum outward extension in confronting relationship to the shutter blade extension 206 so as to provide minimum aperture and exposure. Intermediate values of aperture and exposure are simply achieved by de-energizing the control solenoid 72 earlier so as to engage one of the other 'daylight' cam steps, i.e., exposure control cam steps 140b-140h. Drop-in into control cam step 140a in daylight mode is prevented by the control circuit.

In this respect it should be noted, particularly as shown in FIG. 7, that the second step 54b of the stroke limiter cam 54 will be positioned to limit the shutter aperture if the control pawl 126 is released to engage step 140b of the exposure control cam 140. The height of step 54b is specifically chosen to provide the hyperfocal aperture stop setting of f/5.5 when the lens is set to the long-focus position, such as is shown in FIG. 9. As previously mentioned, this will set the lens 43 to a focus distance of 13.5 feet, which in conjunction with this hyperfocal aperture setting will place the extreme edges of the field of focus at infinity and approximately 7 feet respectively.

An optional macro-focusing system is provided which will arrest the initial rotation of the focus control ring 40 almost immediately. In this mode of operation the camera will also be automatically operated between flash and daylight mode according to ambient sensings. In macro-daylight mode the aperture is corrected according to ambient illumination by the control circuit; whereas in macro-flash mode the aperture is always set to its minimum value, i.e., the exposure control cam assembly will be set to the extreme position shown in FIG. 9.

To achieve this, a macro control member 286 is pivotally mounted on a pivot 288 and urged in a clockwise direction by a spring 89. An extension 291 of the macro control member 286 confronts the macro switch 294 connected to the control circuit by leads 296,298. A manually operated locking lever (not shown) is actuated to rotate the macro control member 286 in a modest counterclockwise direction to present the end face 292 of the macro control member in a confronting relationship to a face 290 provided on the focus control ring extension 250. During the focus adjusting operation, the engagement of the macro control member end 292 with the face 290 of the focus control ring extension 250 terminates rotation of the lens almost immediately, resulting in an ultra-short object focusing distance of 1.5 feet. A partial view of this state of affairs is shown in FIG. 10.

A control circuit for governing the energization and de-energization times of the control solenoid 72 to achieve the above-mentioned objectives is shown in FIG. 12. It will be recalled that all of these timing operations are oriented towards dropping the exposure control pawl 126 into engagement with the proper step in the exposure control cam 140 during the rotation of the exposure control cam assembly 52. The control circuit is therefore provided with three kinds of information, namely, the ambient light intensity, filmspeed information, and the instantaneous position of the exposure control cam 140.

With reference to FIGS. 10 and 12, the sequential contacting of the contacting pads K1-K9 by the fingers 169—169 of the rotary contactor 164 is shown schematically as a sequential stepwise contacting by a moving rotor 13 connected to a line L2, and starting at a dormant position contacting an initial wide metallization K1, and sequentially contacting the remaining terminal pads K2-K9.

The circuit of FIG. 12 provides the following features. If ambient light is weak, either in normal or macro mode, the system will automatically energize the flash system. further, in the "normal", i.e., non-macro, mode, the exposure control cam 140 must be arrested by dropping the control pawl 126 into the first (maximum aperture) step of the exposure control cam, i.e., step 140a. On the other hand, in the macro mode, the system must provide for minimum aperture, in which case the pawl must arrestingly engage the last step of the exposure control cam, i.e., step 140i. If the light is adequate ("daylight mode"), then irrespective of whether the system is in the normal or macro mode, the control pawl 126 must drop into one of the eight remaining control cam steps 140b-140h by appropriately timed deenergization of the control solenoid 72.

In the control circuit shown in figure 12, the system is brought up to a power-on condition by downward pressure on a shutter button 2 pressing a pair of switch contacts 4,6 together prior to applying pressure to the shutter release bar 32 (shown also in FIG. 1), this bar being urged in a clockwise direction by a loading spring 11. System power from a 3-volt battery B will then be supplied to all circuits before the shutter release bar 32 disengages the mechanical systems from the latched condition. In the preferred embodiment, system power is provided via a timer circuit 7 which may take any one of a variety of forms, here symbolically represented by a switch S3, and having the property that immediately upon contacting engagement between the switch leaves 4,6, the timer circuit 7 will pass battery power to the rest of the system not only for so long as the switch leaves are in contact, but also for a period of a minute or so after release of pressure on the shutter button. Thus, merely tapping the shutter button 2 lightly will bring all electrical systems to an active state, to remain there for a substantial period of time. This has the result of supplying battery power at various voltage levels to the circuit via a power supply 9, which may take any one of a variety of conventional forms, including a voltage doubler and associated regulators.

With particular reference to the flash circuit 3 energizing tube 5, it will be noted that the battery voltage is supplied thereto. The flash tube 5 will be triggered upon closure of the switch S2, which in the preferred embodiment is formed by making the stroke limiter cam 54 (FIG. 3) and the coupling arm 50 out of metal. Connections are provided to these elements, and they are suitably insulated from each other, so that engagement of the extension element 206 of the coupling arm 50 causes the flash circuit to trigger and fire the flash tube 5. A flash enable/disable circuit 1 is provided which will inhibit this flash firing when light conditions are adequate.

Overall system control is governed by ambient sensings. An analogue signal representative of ambient illumination is produced by a photosensor P, preferably a solar diode, generally oriented to face the scene to be photographed and producing an output signal indicative of scene intensity. This signal is amplified by an operational amplifier OA1 and fed to an attenuation resistor R3 to appear on control line L1. The DC level of line L1 will take increasing positive values with increasing scene illumination.

Provision is made to weight the signal level on control line L1 according to filmspeed. This is accomplished by providing four sensing probes P1-P4 disposed within the camera to contact coded filmspeed-indicating areas on a film cartridge utilizing the Kodak DX TM sensing code, wherein a metallized common area, contacted by probe P1, underlies a row of adjacent sensing areas on the surface of the film cassette. Filmspeed coding is accomplished by putting insulating coatings over selected ones of these areas according to a generally accepted coding scheme. Three such areas are sensed by the probes P2-P4, each probe being connected to one of the binary input terminals 10,12,13 of a binary-to-decimal decoder DCD, here taken to be of the 4028 type. The probe P1 contacting the common metallization is held high by applying 3 volts thereto. The remaining probes are pulled down through resistors R1—R1, and will only be pulled to a high state in the event that they contact the metallized layer. The coding scheme employed in such cassettes is such that filmspeeds running from ISO 25 to ISO 160 represent, when converted from binary to decimal form by the decoder DCD, a value of 0, 1 or 2. Pins 3, 14 or 2 will be selectively placed in a high state according to which of these sensings are sensed. Diodes D—D, grounded by resistor R2, will accordingly cause the diode-resistor juncture to be pulled high if a filmspeed in the range of ISO 25 to ISO 160 is sensed. Output pin 4 will be driven high if a filmspeed sensing in the range of ISO 200-320 is sensed, and output pin 15 will be driven high if an ISO speed of 400-640 is sensed. These three possible output states are used to control three individually controllable attenuator stages.

Three amplitude comparators AC1-AC3 are provided, these comparators being of the open-collector type, and each having one reference input tied to a reference potential of approximately 0.6 volts provided by the resistive divider R19,R20. A resistor R3 of nominal value of 30 kilohms is inserted into the output of operational amplifier OA1. Each amplitude comparator has its collector connected to the control line L1 through an associated resistor, so that selective energization of each amplitude comparator AC1–AC3 will cause a fixed attenuation of the signal level present on line L1. For film sensings in the low filmspeed range, i.e., ISO 25–ISO 160, amplitude comparator AC3 will be actuated to connect its load resistor R6, having a value of 3.9 kilohms to ground. In this case, an attenuation factor of approximately 8 will be introduced, thereby reducing the voltage on line L1 accordingly. For filmspeed sensings in the intermediate range of ISO 200–320, output terminal 1 is driven high to actuate amplitude comparator AC1, thereby connecting its load resistor R4 having a nominal value of 10 kilohms to ground, thereby introducing an attenuation of 4. For a filmspeed sensing in the range of ISO 400–640, output pin 15 is driven high, thereby actuating amplitude comparator AC2 to introduce a factor of 2 attenuation onto the line. For higher filmspeed sensings than ISO 640, none of the amplitude comparators AC1–AC3 is energized, resulting in substantially no line attenuation. Additional attenuators may be employed at will, similarly connected to appropriate other terminals of the decoder DCD to accommodate the higher filmspeed ranges, and may further be used to provide for more refined attenuation in the filmspeed range of ISO 25–160. Such systems are quite well known in the art.

Thus, it will be seen from the foregoing that the voltage on line L1 will assume higher values with increasing values of ambient illumination, and with increasing sensed values of filmspeed at the same level of ambient illumination. As will subsequently be seen, these increasing level values on line L1 will cause the degree of rotation of the rotor 13, and hence the terminal position of the exposure control cam 140 (FIG. 1) to assume positions which successively produce less and less shutter opening, so as to correct the exposure for ambient illumination and filmspeed.

A design value of 20 millivolts on line L1 is established to govern flash enabling. If the control line voltage on line L1 is less than this value, the system will automatically be actuated to flash mode. This is accomplished by means of amplitude comparator AC4, having its input terminal 1 connected to control line L1. The reference terminal 2 of comparator AC4 is set at a stable 20 millivolts by a 100-to-1 divider consisting of resistors R7 and R8 powered by two volts. If the signal voltage on control line L1 is less than the reference voltage of 20 millivolts applied to reference terminal 2 of the comparator AC4, then the output voltage provided to control line L4 will be in a high state. The flash enable/disable circuit is to be designed so as to be enabled when line L4 is in this high state, and to be disabled when line L4 is low, i.e. when the control voltage on line L1 is above the threshold value. Switch S1 is the manually controlled macro control switch 294 previously discussed with reference to FIG. 10, and will be assumed to be in the open circuit condition (normal mode) unless otherwise stated.

Considering first daylight operation in the normal (non-macro) mode, the control voltage on line L1 will be greater than the threshold voltage of 20 millivolts. Thus, in the dormant state with the rotor as shown in FIG. 12, the control solenoid 72 is energized. This control line voltage is fed to input terminal 1 of a second amplitude comparator AC5. The output of this comparator is fed through a resistor R9 to the base of a pnp transister Q1 having its collector grounded through the control solenoid 72. A low state at the output of amplitude comparator AC5 will therefore pull the transister Q1 to an on condition so as to energize the control solenoid 72. To release the solenoid 72 from an energized condition, it will be necessary that the input voltage applied to input terminal 2 of the comparator AC5 rise above the signal level on control line L1.

This is provided by the step attenuator consisting of the contacts K1–K8 having bridging resistors R12–R18 therebetween, contact K1 being further returned to ground through resistor R11. Contact terminal K8 is also connected to the regulated 2-volt output of the regulator 9. Contact K9 is connected to the power supply voltage of 3.5 volts. The rotor 13 is shown in the dormant position contacting the long arcuate contactor segment K1. The values of resistors R11–R18 are chosen so that the voltage applied to contact K1 is equal to the threshold voltage of 20 millivolts. The values of these resistors R11–R18 are further chosen so that the voltage at K2 is twice the voltage at K1, the voltage at K3 is twice the voltage at K2, etc. Thus, when the system is released into a scanning mode under daylight conditions, the voltage applied to line L2 is insufficient to trigger the comparator AC5. A series of voltage pulses will thus appear on line L2 of progressively increasing magnitude until one of the contactors beyond K1 is contacted to supply a voltage greater than the control voltage on line L1. This will immediately cause comparator AC5 to output a high state, thereby de-energizing the solenoid so as to cause the exposure control cam 140 to drop into engagement with one the proper step thereon. Note that, as required in the previous discussion, under daylight conditions in the normal mode step 140a of the exposure control cam 140 is not engaged, i.e., only the hyperfocal aperture corresponding to engagement with step 140b is allowed, or reduced aperture settings therebeyond.

Considering next the macro mode in daylight operation, manual closure of switch S1 causes the control signal present on line L4, and representing the flash threshold sensing, to be fed to the base of an npn transistor Q2 via resistor R10. Recalling that line L4 is low in bright light, transistor Q2 will be in the off condition and will exert no influence on the signal fed to the base of transistor Q1 by comparator AC5. Transistor Q1 is therefore fully responsive to the output of comparator AC5, and will accordingly de-energize the solenoid 72 when the signal delivered from the rotor 13 reaches an appropriate value, causing the exposure control cam 140 to be engaged by the control pawl 126 at an appropriate aperture-controlling value.

Considering finally the two situations where flash is required, and considering first the normal (non-macro) configuration wherein switch S1 is open, the control signal on line L1 will be below the decision threshold set by the attentuator resistors R7–R8, with the result that the voltage applied to terminal 1 of comparator AC5 will be less than that produced at the rotor 13, even in the dormant cocked condition thereof. The result is that the signal level at terminal 2 of the comparator AC5 is already above that applied to terminal 1, causing the output of comparator AC5 to go to a high state, immediately de-energizing transistor Q1, to de-energize the control solenoid 72. As a result of this, the control pawl 126 will follow the cam profile to engage the first control cam step 140a, thus setting the aperture at its maximum value and arresting the lens 43 in its short-focus position. The limiting position of the rotor 13 in this case is within the rectangular boundary to the left of the dotted line K1'.

Considering finally the macro mode under weak lighting conditions, here switch S1 is closed, and will take control over transistor Q1 at any time line L4 is high (weak light) by turning on on transistor Q2. This effectively grounds the left side of resistor R9, removing control from the comparator AC5 and holding transistor Q1 in a permanently on condition. The result is that the rotor 13 will rotate completely to its terminal position in contact with terminal K9, at which time the rotation of the exposure control cam 140 is terminated by engagement of the oversize terminal cam surface 140i with the control pawl 126.

It will be noted from the foregoing, with respect to normal (non-macro) operation of the system, that the flash enabling or disabling decision is made immediately, i.e., before system rotations occur. Whether the lens is to be operated to the near-focus or far-focus position is similarly immediately established, and the solenoid 72 is set at the appropriate energized or de-energized state at the same time. Considering in particular normal daylight operation, and with particular reference to FIG. 8, showing an intermediate phase where the exposure control cam has advanced just beyond its first step 140a, it will be noted that the length of the passage dividing wall 254 in the focus control ring extension 250 is provided with sufficient length that any additional synchronous rotation of the focus control cam and the focus control ring 40 will be accompanied by a trapping of the focus control pin 268 in the inner (long focus) passage 256. Thus, irrespective of which of the daylight cam steps 140b–140i is subsequently engaged by the control pawl 126, the focus control ring 40 will proceed to the far-focus position.

Thus, it will be seen that the system provides herein provides all necessary focus and aperture control functions in the normal mode by the timed energization and de-energization of a single solenoid, appropriately coupled to control the two systems selectively. The extra expense and the extra current consumption attendant to prior art employment of additional solenoids to provide the necessary control functions is completely eliminated.

It will further be recognized that a great many other mechanical systems may be employed to achieve the above-described results without departing from the scope of the claimed invention. Alternative means for realizing complete system control using a single main control means operable between two operative states, e.g., a solenoid-operated armature operable between two controlling positions, will readily be apparent to those of ordinary skill in the art.

Thus, while the invention has been described with reference to a preferred embodiment, it will be understood by those skilled in the art that various changes may be made and equivalents may be substituted for elements thereof without departing from the broader aspects of the invention. Also, it is intended that broad claims not specifying details of a particular embodiment disclosed herein as the best mode contemplated for carrying out the invention should not be limited to such details. Furthermore, while, generally, specific claimed details of the invention constitute important specific aspects of the invention in appropriate instances even the specific claims involved should be construed in light of the doctrine of equivalents.

I claim:

1. In an improved electrically operated camera having a variable focus lens, a focus setting system for establishing at least two focus settings of said lens respectively at a far-focus distance less than infinity and a near-focus distance less than said far-focus distance, an aperture adjustment system for controllingly setting the lens aperture to a maximum aperture value and to at least one reduced aperture value no greater than the hyperfocal aperture value corresponding to said far-focus setting of said lens, a flash system for scene illumination, a photosensor means responsive to scene illumination, a user-operated release member operable at least to a picture-taking position, a shutter, and a shutter actuating system responsive to movement of said user-operated release member to said picture-taking position to operate said camera shutter, the improvement comprising:

said control system including a single main control means operable between first and second states for controlling both said focus setting and aperture values;

means operable upon at least partial operation of said release member and responsive to illumination below a given value sensed by said photosensor means for enabling triggering of said flash system and for effecting operation of said main control means at said first state, and responsive to said illumination above said given value sensed by said photosensor means for disabling the triggering of said flash system and for effecting the operation of said main control means at said second state, additional control means responsive to the operation of said single main control means to said first state for operating said aperture adjusting system to establish said lens aperture at said maximum value and for operating said focus setting system to establish said lens at said near-focus setting, said additional control means being responsive to the operation of said single main control means to said second state for operating said aperture adjustment system to operate said lens aperture to said at least one reduced aperture value and to operate said focus setting system to establish said lens at said far-focus setting.

2. The camera of claim 1 wherein said reduced aperture values number at least two, said aperture adjustment system includes a movable aperture control member for setting said aperture values according to the position thereof, an aperture scanning drive system for moving said aperture control member from a dormant initial position through a range of positions corresponding to said aperture values responsive to actuation of the release member and during an adjustment interval before said shutter is opened, and said additional control means includes an aperture arresting member operable for movement between a retracted and an arresting position, means responsive to the first state of said main control means and said photosensor means for effecting operation of said arresting member to said arresting position to stop the aperture control member at a position corresponding to said maximum aperture value and responsive to the second state of said main control means and said photosensor means for effecting operation of said arresting member to said retracted position so that said aperture control member is for a while freely movable past the position corresponding to said maximum aperture value to positions corresponding to said reduced aperture values, said additional control means including position sensing means for sensing the position of said aperture control member and comparison means responsive to correspondence of the aperture setting to the scene illumination indicated by said photosensor means for operating said main control means to said first state to operate said aperture arresting member to said arresting position to set said aperture value at one of said reduced aperture values corresponding to the level of scene illumination.

3. The camera of claim 2 wherein said aperture control member is a rotary member and said arresting member is disposed to arrest the rotation of said aperture control member at chosen orientations thereof to establish chosen aperture values.

4. The camera of claim 3 wherein said arresting member includes an arresting pawl, said rotary member is configured as a cam having a plurality of pawl-engaging steps corresponding to said aperture values, and said single main control means includes a solenoid responsively controlled by said control system and disposed to attractingly hold said pawl in a retracted state with respect to said steps, and there is provided means for urging said pawl to a released step-engaging position when said solenoid is de-energized.

5. The camera of claim 4 wherein said first state of said main control means corresponds to retention of said pawl by said solenoid during the energization thereof, and said second state corresponds to a released condition therebetween with said solenoid de-energized.

6. The camera of claim 1 wherein said lens focusing system includes a focus control member movably coupled to the movement of said lens during the focusing thereof, a focus scanning drive system for moving said lens from a dormant initial position through a range of focus settings including said at least two focus settings responsively to actuation of said release member and during an adjustment interval before said shutter is opened, and said additional control means including a focus arresting member operable responsively to the operative states of said single main control means for movement between a near-focus arresting position and a far-focus arresting position with respect to said focus control member so that when said single control means is in said first operative state said focus arresting member is disposed to engagingly arrest the movement of said focus control member to set said lens at said near-focus setting and so that when said main control means is in said second operative state said focus arresting member is disposed to engagingly arrest the movement of said focus control member to set said lens at said far-focus position.

7. The camera of claim 2 wherein said lens focusing system includes a focus control member movably coupled to the movement of said lens during the focusing thereof, a focus scanning drive system for moving said lens from a dormant initial position through a range of focus settings including said at least two focus settings responsively to actuation of said release member and during an adjustment interval before said shutter is opened, and said additional control means including a focus arresting member operable responsively to the operative states of said single main control means for movement between a near-focus arresting position and a far-focus arresting position with respect to said focus control member so that when said single control means is in said first state said focus arresting member is disposed to engagingly arrest the movement of said focus control member to set said lens at said near-focus setting and so that when said main control means is in said second state said focus arresting member is disposed to engagingly arrest the movement of said focus control member to set said lens at said far-focus position.

8. The camera of claim 7 wherein said focus control member and said focus arresting member are configured for mutual trapped non-arresting engagement in at least first and second trapping configurations selectively established responsively to the state of said main control means before substantial movement of said focus control member during said adjustment interval, said trapped engagement being maintained thereafter irrespective of changes in said state of said main control means, said focus control member and said focus arresting member being further configured so that arresting engagement occurs therebetween at different positions of said focus control member to establish different lens focus settings.

9. The camera of claims 1 or 2 wherein said single main control means includes a single solenoid energizingly governed by said control system and a movable solenoid armature means operable between first and second positions corresponding to said first and second states, and coupled to arrestingly govern said aperture adjustment system and focus setting system.

10. The camera of claim 7 wherein said single main control means includes a single solenoid energizingly governed by said control system and a movable solenoid armature means operable between first and second positions corresponding to said first and second states, and coupled to arrestingly govern said aperture adjustment system and focus setting system, said aperture control member is configured as a rotatably mounted aperture control cam having at least three cam steps thereon, and said aperture arresting member is a cam-engaging pawl coupled to be operable responsively to the state of energization of said solenoid between a retracted position and an engaging position for arrestingly terminating the rotation of said aperture control cam by engagement with one of the steps thereof.

11. The camera of claim 10 wherein said focus arresting member is releasably coupled to the movement of said aperture arresting member to be positioned for trapping according to whether said aperture arresting member is in said retracted or released position.

12. The camera of claim 10 wherein said focus control member is a rotary member coupled to said lens so as to rotate through a range of angular positions corresponding to various lens focus settings.

13. The camera of claim 12 wherein said single control means is a solenoid, said focus arresting member is configured as a pivotally mounted arm coupled to be rotated between two extreme positions by said solenoid and having an arresting pin at the end thereof, said focus control member is provided with adjacent peripheral arc-shaped long-focus and near-focus passageways centered on the axis of rotation of said focus control member, each passageway being configured to slidingly accept said arresting pin, said passageways being separated by an arcuate barrier wall, adjacent initial ends of said passageways being joined together by a joining passageway disposed to accept said arresting pin so that before rotation of said focus control member said arresting pin is positioned to enter the far-focus or near-focus passageway according to the energization of said solenoid to be trapped therein during subsequent rotation of said focus control member, terminal ends of said passageways being configured to engage said arresting pin at positions corresponding to the far-focus and near-focus settings of said lens.

14. The camera of claim 10 wherein one of said terminal focus settings is a macrofocus setting corresponding to an object focusing distance substantially less than said near-focus distance, said camera further including holding means operative between arresting and non-arresting positions for arrestingly holding said lens at said macrofocus setting.

15. The camera of claim 14 further including means responsive to operation of said holding means to said arresting position for operating said control system so as to arrestingly hold said aperture control member at a position corresponding to said minimum aperture value when said flash system is enabled and so as to arrestingly hold said aperture control member at a position governed by the level of scene illumination when said flash system is disabled.

16. The camera of claim 10 further including means for adusting said given value of illumination to which said responsive means responds according to filmspeed.

17. The camera of claim 16 wherein said position sensing means includes means for providing to said comparison means a progressively changing voltage value corresponding to the varying positions of said aperture control member, and said photosensor means provides to said comparison means an electrical control signal varying with sensed scene illumination, the equality of said progressively varying voltage and said electrical control signal establishing said given value of illumination.

18. The camera of claim 17 including means for varying the magnitude of one of said progressively varying voltage values and said electrical control signal according to filmspeed.

19. The camera of claim 18 including controllable attenuator means for attenuating said electrical control signal according to filmspeed.

20. The camera of claim 10 wherein said single control means is a solenoid and said focus arresting member is coupled to said solenoid to be operable between a near-focus member position and a far-focus member position, said focus control system including trapping means for trapping said focus arresting member at one of said member positions during an initial portion of the rotation of said focus control member so as to remain in said one member position thereafter irrespective of the state of energization of said solenoid, said trapping means and said focus arresting member being configured to arrestingly terminate focus control member rotation at a position corresponding to the far-focus lens position when said focus arresting member is trapped in said far-focus member position and at a position corresponding to said near-focus lens position when said focus arresting member is trapped at said near-focus member position.

21. The camera of claim 10 wherein said shutter is of the variable-aperture type having an effective aperture established by a controllable stroke length, and said aperture control means includes a rotatably mounted stroke-limiting cam disposed to arrestingly govern said stroke length according to the position of said stroke-limiting cam, said stroke-limiting cam being coupled to the rotation of said aperture control member, said control means including means for arresting the rotation of said stroke-limiting cam according to the position of said aperture control member.

22. The camera of claim 21 wherein said aperture control member is configured as a rotatably mounted aperture control cam coupled to the rotation of said stroke-limiting cam and having at least three cam steps thereon, and said aperture arresting member is a spring-biased cam-engaging pawl coupled to be operable responsively to the state of energization of said solenoid between a retracted position and an engaging position for arrestingly terminating the rotation of said aperture control cam by engagement with one of the steps thereof.

23. The camera of claim 22 wherein said focus control system drives said lens to focus at progressively increasing object distances and said aperture control system drives said aperture control cam to serially present for engagement by said pawl a first step corresponding to a maximum aperture setting of said stroke-limiting cam, a second step corresponding to a hyperfocal aperture setting for said lens at said far-focus position, and at least one additional cam step corresponding to at least one aperture setting less than said hyperfocal aperture setting.

24. The camera of claims 1, 6, 7, or 10 wherein said focus control system drives said lens to focus at progressively increasing object distances.

25. The camera of claims 1, 6, 7 or 10 wherein said far-focus setting is one of said limiting focus settings.

26. The camera of claims 2, 6, 7, or 10 wherein the largest of said reduced aperture values is the hyperfocal value corresponding to said far-focus setting.

27. In an improved electrically operated camera having a picture-taking lens, a photosensor means for producing photosensing control signal conditions indicative of scene illumination, a flash system, an aperture adjustment system responsive to said photosensor means for controllingly setting the lens aperture to a maximum aperture value and to a plurality of reduced aperture values, a user-operated release member operable at least to a picture-taking position, a shutter, and a shutter actuating system responsive to movement of said user-operated release member to said picture-taking position to operate said shutter, main control means responsive to said photosensing control signal conditions by assuming a first state for a scene illumination below a given value and a second state for a scene illumination above said value, means operable upon at least partial operation of said release member and responsive to illumination below a given value sensed by said photosensor means for enabling triggering of said flash system and for effecting operation of said main control means at said first state, and responsive to said illumination above said given value sensed by said photosensor means for disabling the triggering of said flash system and for effecting the operation of said main control means at said second state, the improvement wherein said aperture adjustment system comprises:

a movable aperture control member for setting said aperture values according to the position thereof;
    an aperture scanning drive system for moving said aperture control member from a dormant initial position through a range of positions corresponding to said aperture values responsive to actuation of the release member and during an adjustment interval before said shutter is opened; an aperture arresting member operable for movement between a retracted and an arresting position; means responsive to the first state of said main control means and said photosensor means for effecting operation of said arresting member to an arresting condition to later stop the aperture control member at a position corresponding to said maximum aperture value and responsive to the second state of said main control means and said photosensor means for effecting operation of said arresting member to said retracted position so that said aperture control member is for a while freely movable past the position corresponding to said maximum aperture value to positions corresponding to said reduced aperture values; position sensing means for sensing the position of said aperture control member and comparison means responsive to correspondence of the aperture setting to the scene illumination indicated by said photosensor means for operating said main control means to said first state to operate said aperture arresting member to said arresting position to set said aperture value at one of said reduced aperture values corresponding to the level of scene illumination.

28. The camera of claim 27 wherein said aperture control member is a rotary member and said aperture arresting member is disposed to arrest the rotation of said aperture control member at chosen orientations thereof to establish chosen aperture values.

29. The camera of claim 28 wherein said arresting member includes an arresting pawl, said rotary member is configured as a cam having a plurality of pawl-engaging steps corresponding to said aperture values, and said main control means includes a solenoid responsively energized by said photosensor means and disposed to attractingly hold said pawl in a retracted state with respect to said steps, and there is provided means for urging said pawl to a released step-engaging position when said solenoid is de-energized.

30. The camera of claim 29 wherein during operation of said aperture adjustment system said solenoid is maintained in said de-energized condition when said photosensor means senses a scene illumination below said given level.

* * * * *